(12) United States Patent
Hutter et al.

(10) Patent No.: US 9,242,679 B2
(45) Date of Patent: Jan. 26, 2016

(54) SECURING ARRANGEMENT AND METHOD FOR VEHICLE COMPONENTS

(71) Applicant: Honda Motor Co., Ltd., Tokyo (JP)

(72) Inventors: Alexander Hutter, Plain City, OH (US); Matthew Paul Horbaly, Dublin, OH (US); James Paul Ryan, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/205,425

(22) Filed: Mar. 12, 2014

(65) Prior Publication Data

US 2014/0265407 A1   Sep. 18, 2014

Related U.S. Application Data

(60) Provisional application No. 61/782,665, filed on Mar. 14, 2013.

(51) Int. Cl.
| | |
|---|---|
| *B21D 53/88* | (2006.01) |
| *B62D 27/02* | (2006.01) |
| *B29C 45/14* | (2006.01) |
| *B29C 70/68* | (2006.01) |
| *B29C 70/70* | (2006.01) |
| *B62D 29/00* | (2006.01) |
| *B62D 43/10* | (2006.01) |
| *B29C 65/00* | (2006.01) |

(52) U.S. Cl.
CPC ............. *B62D 27/026* (2013.01); *B21D 53/88* (2013.01); *B29C 45/14819* (2013.01); *B29C 66/742* (2013.01); *B29C 70/68* (2013.01); *B29C 70/70* (2013.01); *B62D 29/005* (2013.01); *B62D 43/10* (2013.01); *B29C 66/02* (2013.01); *Y10T 29/4998* (2015.01)

(58) Field of Classification Search
CPC ............... Y10T 29/49982; Y10T 29/4998; Y10T 29/49952; Y10T 29/4997; B62D 65/02; B62D 27/026; B62D 43/10; B62D 29/005; B21D 53/88; B29C 45/1671; B29C 45/14819; B29C 2045/14147; B29C 70/70; B29C 70/68; B29C 65/785; B29C 65/4835; B29C 65/742; B29C 65/43; B29C 65/1122; B29C 66/02
USPC ............... 264/264, 275, 279, 279.1; 296/37.2
See application file for complete search history.

(56) References Cited

U.S. PATENT DOCUMENTS

| | | | |
|---|---|---|---|
| 3,657,050 A | 4/1972 | Regan | |
| 3,879,247 A | 4/1975 | Dickey | |
| 6,042,057 A * | 3/2000 | Rice | 244/158.1 |
| 6,986,827 B2 | 1/2006 | Matsui et al. | |
| 2003/0038100 A1* | 2/2003 | Liu | 211/88.01 |

FOREIGN PATENT DOCUMENTS

| | | |
|---|---|---|
| JP | 482675 | 3/1992 |
| JP | 2010184683 | 8/2010 |

\* cited by examiner

*Primary Examiner* — Jermie Cozart
(74) *Attorney, Agent, or Firm* — Rankin, Hill & Clark LLP

(57) ABSTRACT

A securing arrangement and method for securing a first vehicle component having a generally nonmetallic body to a second metallic vehicle component includes the first vehicle component having at least one magnet fixably secured thereto. An adhesive is applied and one or both of the first and second vehicle components are positioned relative the other of the first and second vehicle components for connecting the first and second vehicle components with the adhesive. The at least one magnet prevents relative movement between the first and second vehicle components while the adhesive cures.

18 Claims, 5 Drawing Sheets

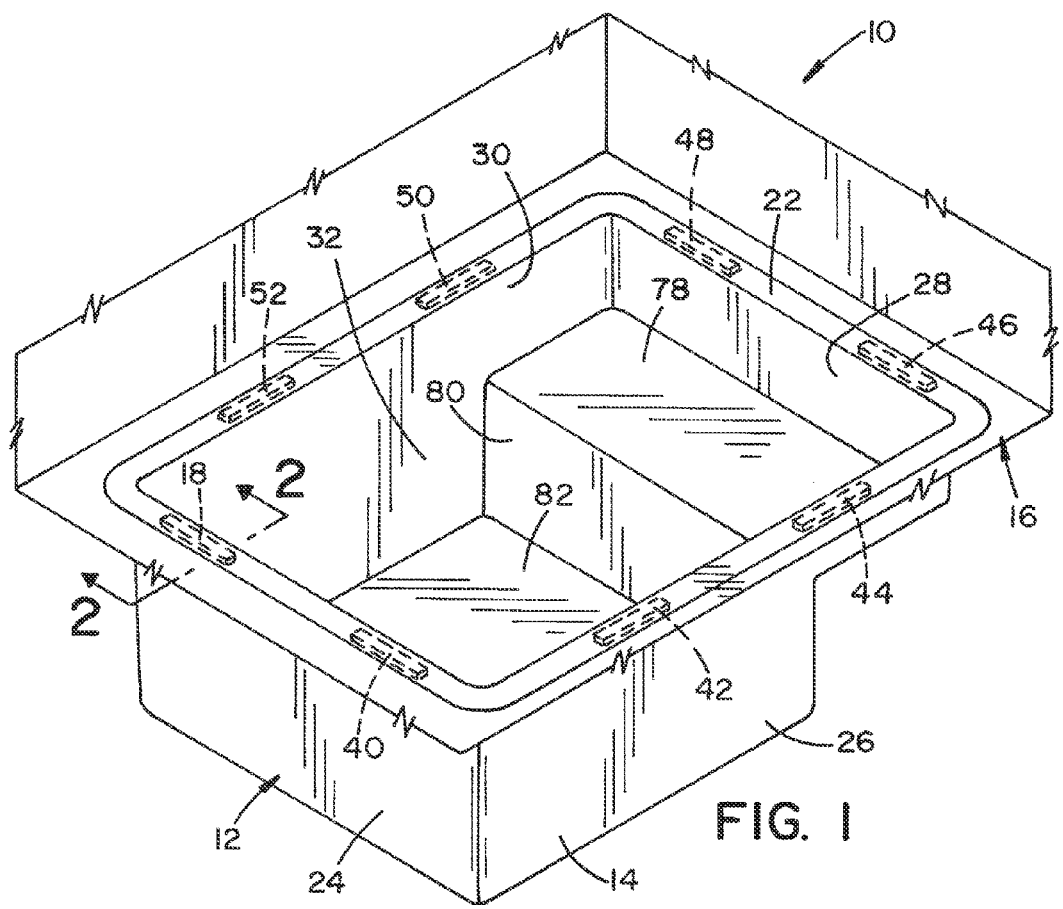
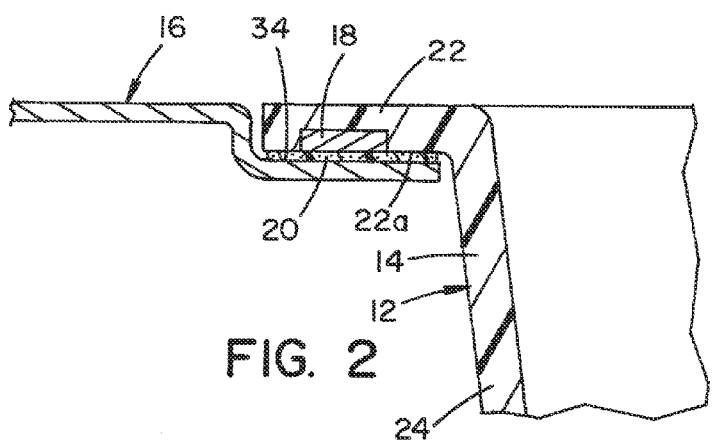

SECURING ARRANGEMENT AND METHOD FOR VEHICLE COMPONENTS

PRIORITY STATEMENT

This application claims priority to U.S. Provisional Application Ser. No. 61/782,665 filed on Mar. 14, 2013, which is expressly incorporated herein by reference.

BACKGROUND

In the field of vehicle design, there continues to be increased emphasis on vehicle light-weighting. Advantages of light-weighting include improved fuel economy and reduced materials costing. As a result of this increased emphasis on vehicle light-weighting, many vehicle parts and components traditionally made of steel are presently being replaced with other materials, such as aluminum and plastic. One example part of this type is the spare tire well or pan, particularly that used in sedan-type vehicles, which is often disposed in the trunk of the vehicle. Previously, the spare tire pan was made of stamped sheet metal and attached to the vehicle white body by means of welding. There is now interest in manufacturing the spare tire pan of a lighter material.

Attaching non-steel parts (e.g., resin parts) to a vehicle body can present numerous technical challenges as compared to traditional fastening methods for metal-to-metal connections. While mechanical attachments such as bolts, screws, rivets, etc. are possible, these methods present unique challenges for resin parts in terms of long term durability of the attachment, particularly due to concerns from heating and continuous loading. If not carefully engineered, there is a potential for such conditions to cause premature failure of the connections due to torque loss from creep in the plastic material. Such concerns can be reduced by using metal collars inserted into the fastener area of the plastic to ensure metal-to-metal contact between the fastener and the vehicle body, but use of such metal collars increase costs.

Another alternative fastening method involves the use of adhesives to bond a plastic part to a metal structure. With proper surface treatment of the bonded surfaces, this technique can be very effective in achieving a high quality, durable bond. One drawback of this technique, however, is the length of time it typically takes for the bond between the two materials to cure or "set up." In other words, sufficient time must be given for the adhesive to cure and the bond to become established. During this period, there is a need to limit any relative motion between the surfaces to be bonded. In vehicle manufacture, this is often not feasible because the vehicle is moved along an assembly line and is subject to jostling. To stop movement of a vehicle body along an assembly line for the amount of time required to set up such a bond would reduce efficiency of the manufacturing line undesirably.

SUMMARY

According to one aspect, a method is provided for securing a first vehicle component having a generally nonmetallic body to a second metallic vehicle component. In the method according to this aspect, the first vehicle component is provided with at least one magnet fixably secured to the generally nonmetallic body of the first vehicle component. An adhesive is applied to at least one of the first vehicle component or the second vehicle component. At least one of the first vehicle component or the second vehicle component is positioned relative the other of the first vehicle component or the second vehicle component for connecting the first and second vehicle components with the adhesive. The at least one magnet prevents relative movement between the first and second vehicle components while the adhesive cures.

According to another aspect, a securing arrangement is provided between a first vehicle component having a generally nonmetallic body and a second metallic vehicle component. This securing arrangement includes at least one magnet fixably secured to the nonmetallic body of the first vehicle component and an adhesive bonding at least a portion of the nonmetallic body of the first vehicle component to the second metallic vehicle component. The at least one magnet secures said at least a portion of the nonmetallic body to the second metallic vehicle component during curing of the adhesive.

According to a further aspect, a vehicle includes a first vehicle component having a generally nonmetallic body, a second metallic vehicle component and at least one magnet fixably secured to the nonmetallic body of the first vehicle component. The vehicle further includes an adhesive bonding at least a portion of the nonmetallic body of the first vehicle component to the second metallic vehicle component. The at least one magnet secures said at least a portion of the nonmetallic body to the second metallic vehicle component until the adhesive is cured.

BRIEF DESCRIPTION OF THE DRAWINGS

FIG. 1 is a partial perspective view of a first vehicle component (e.g., a spare tire pan) having a generally nonmetallic body secured to a second metallic vehicle component (e.g., vehicle white body) with at least one magnet provided for securing relative positioning between the first and second vehicle components.

FIG. 2 is a cross-sectional view taken along the line 2-2 of FIG. 1.

DETAILED DESCRIPTION

Figure 3:
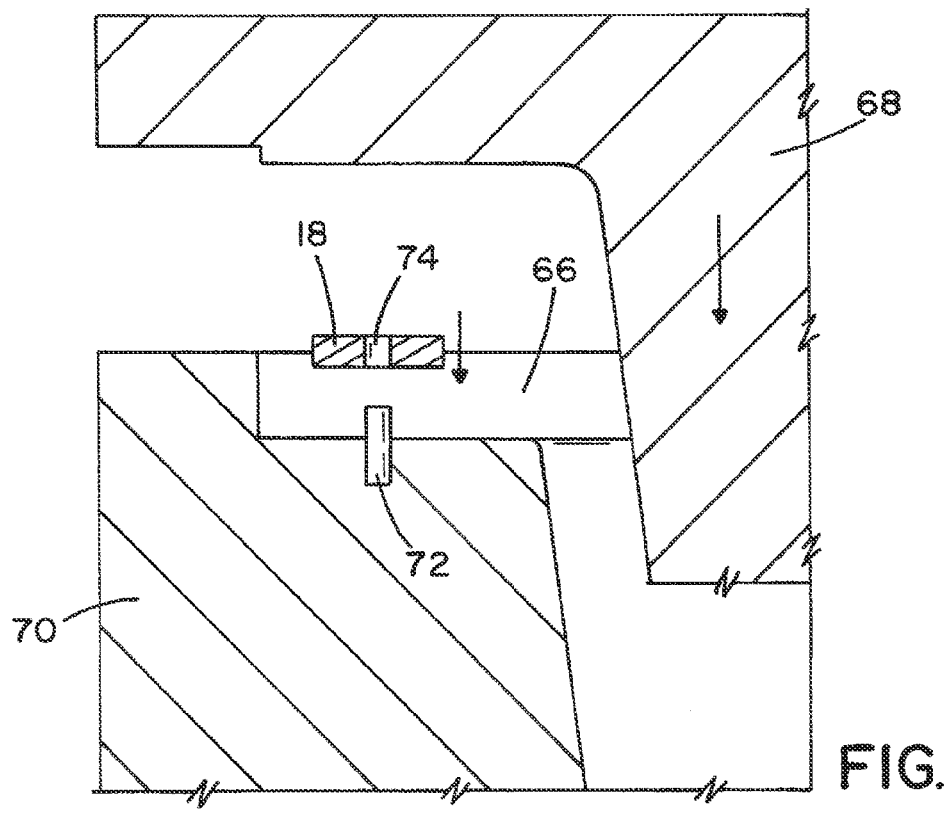
FIG. 3 is a cross-sectional view showing a magnet being installed on a pin of a mold half prior to the other mold half being closed for molding of the first vehicle component.

Referring now to the drawings wherein the showings are for purposes of illustrating one or more exemplary embodiments and not for purposes of limiting same, FIG. 1 illustrates a vehicle 10 including a first vehicle component 12 having a generally nonmetallic body 14 and a second metallic vehicle component 16. With additional reference to FIG. 2, a securing arrangement is shown between the first vehicle component 12 having the generally nonmetallic body 14 and the second metallic vehicle component 16. In the illustrated embodiment, at least one magnet (e.g., magnet 18) is fixably secured to the nonmetallic body 14 of the first vehicle component 12. As best shown in FIG. 2, an adhesive 20 bonds at least a portion (e.g., mounting flange 22) of the first vehicle component 12 to the second metallic vehicle component 16.

As will be described in more detail below, the at least one magnet (e.g., magnet 18) secures said at least a portion (e.g., the mounting flange 22) of the nonmetallic body 14 to the second metallic vehicle component 16 until the adhesive 20 is cured (i.e., during curing of the adhesive 20). In one embodiment, the first vehicle component 12, particularly the nonmetallic body 14 thereof, can be formed of at least one of a plastic, a resin or a composite material. In contrast, the second metallic vehicle component 16 can be formed of steel or some other primarily metallic composition. In the embodiment illustrated in FIGS. 1 and 2, and as shown, the at least one magnet (e.g., magnet 18) can be overmolded, at least partially, by the nonmetallic body 14 of the first vehicle component 12. In particular, the at least one magnet 18 can be overmolded into an underside 22a of the mounting flange 22.

More specifically, and particular to the illustrated embodiment, the first vehicle component 12 can be a spare tire pan and a second metallic vehicle component 16 can be a body-in-white vehicle body, though this is not required. As will be understood and appreciated by those skilled in the art, the first vehicle component can be some other component on the vehicle 10 that includes a generally nonmetallic body. Likewise, the second vehicle component need not be limited to a body-in-white vehicle body, but could be some other component on the vehicle 10 that is metallic or primarily metallic (i.e., to which the at least one magnet will be attracted). As shown in the illustrated embodiment, the first vehicle component 12 configured as a spare tire pan can have the mounting flange 22 and walls 24, 26, 28, 30 depending downwardly therefrom. The walls 24-30 can define a storage compartment 32, which can ultimately be used for storing a spare tire, such as in the trunk of the vehicle 10. As also shown, the mounting flange 22 can be arranged so as to be in a generally horizontal orientation (e.g., relative to the vehicle 10) and overlaps a mounting surface 34 of the second metallic vehicle component 16 (i.e., the body-in-white vehicle in the illustrated embodiment).

The at least a portion of the nonmetallic body 14 bonded by the adhesive 20 to the second metallic vehicle component 16 can be or include the mounting flange 22, and particularly the underside or underside surface 22a of the mounting flange 22 such that the adhesive 20 bonds the underside 22a of the mounting flange 22 to the mounting surface 34 of the second metallic vehicle component 16 (i.e., the body-in-white vehicle body in the illustrated embodiment). Thus, the mounting flange 22 has the at least one magnet (e.g., magnet 18) fixably secured thereto for maintaining relative positioning between the mounting flange 22 and the mounting surface 34. As best shown in FIG. 1, the at least one magnet of the illustrated embodiment includes a plurality of magnets 18, 40, 42, 44, 46, 48, 50, 52 disposed in spaced relation around the mounting flange 22 for securing the mounting flange 22 to the mounting surface 34 until the adhesive 20 therebetween is cured.

Figure 9:
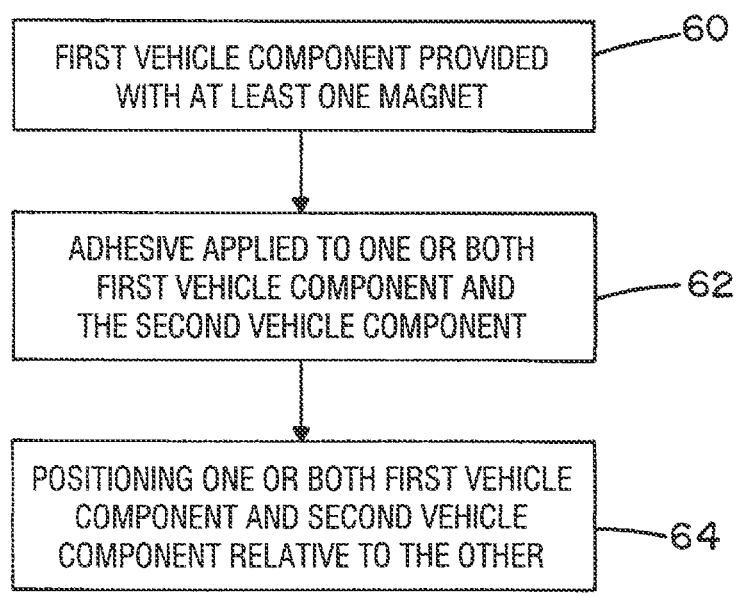
FIG. 9 is a process flow diagram illustrating a method for securing a first vehicle component to a second vehicle component.

With reference now to FIG. 9, a method for securing the first vehicle component having a generally nonmetallic body to a second metallic vehicle component will be described. In particular, the method of FIG. 9 will be described in association with the vehicle 10 and the securing arrangement described hereinabove and illustrated in FIGS. 1 and 2, though this is not required. In the method, as shown at 60, the first vehicle component 12 is provided with at least one magnet (e.g., magnets 18 and 40-52) fixably secured to the generally nonmetallic body 14 of the first vehicle component 12. Next, at 62, the adhesive 20 is applied to at least one of the first vehicle component 12 or the second vehicle component 14 (i.e., the adhesive 20 is applied to one or both of the vehicle components 12, 16). After the adhesive is applied at 62, at least one of the first vehicle component 12 or the second vehicle component 16 (i.e., one or both of the vehicle components 12, 16) is positioned at 64 relative to the other of the first vehicle component 12 or the second vehicle component 16 for connecting the first and second vehicle components 12, 16 with the adhesive 20. As will be described in more detail below, the at least one magnet (e.g., magnets 18 and 40-52) prevents relative movement between the first and second vehicle components 12, 16 while the adhesive 20 cures.

Providing the first vehicle component 12 with said at least one magnet (e.g., magnets 18 and 40-52) can include overmolding the first vehicle component 12 onto said at least one magnet. With additional reference to FIG. 3, such overmolding can include inserting said at least one magnet (e.g., magnet 18) into a mold cavity 66 defined between a pair of mold halves 68, 70. Additionally, such overmolding can include securing a position of said at least one magnet (e.g., magnet 18) within the mold cavity 66 by positioning said at least one magnet on one of the mold halves (e.g., lower mold half 70 in the illustrated embodiment) forming the mold cavity 66. In one embodiment, a magnetic attraction between the at least one magnet and the mold half to which it is secured (i.e., the lower mold half 70 in FIG. 3) secures the position of said at least one magnet within the mold cavity 66. As shown in FIG. 3, the lower mold half 70 can additionally include at least one pin 72 and said at least one magnet can define an aperture 74 for fitting said at least one magnet onto said at least one pin 72. Receipt of said at least one pin 72 in the aperture 74 of said at least one magnet further secures the position of said at least one magnet within the mold cavity 66.

Figure 4:
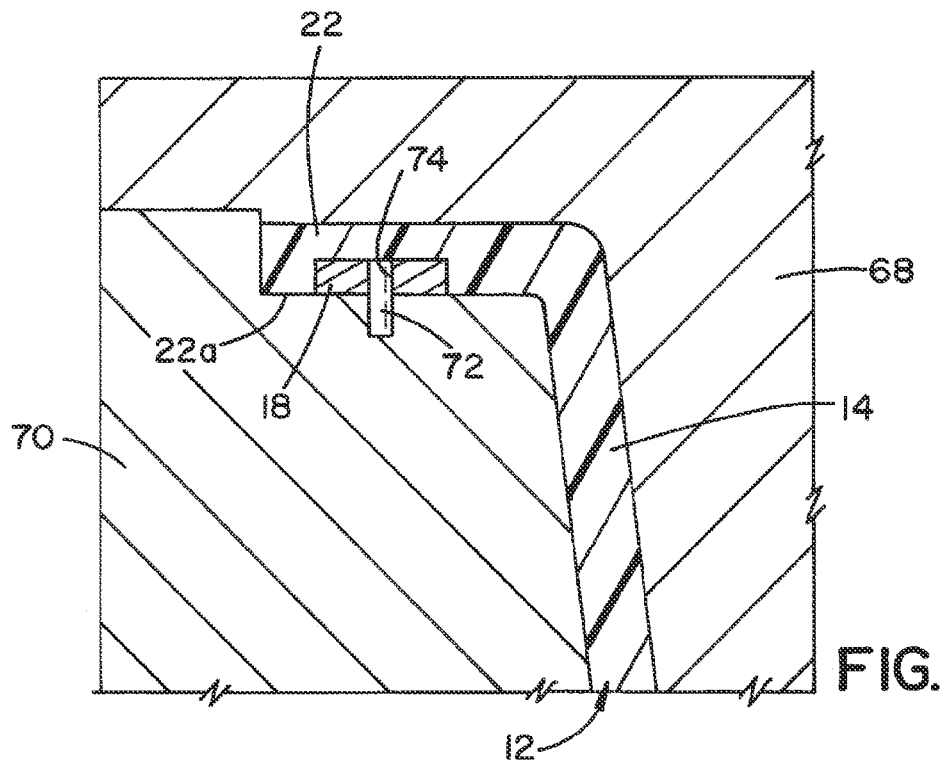
FIG. 4 is a cross-sectional view similar to FIG. 3 but showing the mold halves closed and the first vehicle component molded between the mold halves onto the magnet.
Figure 8:
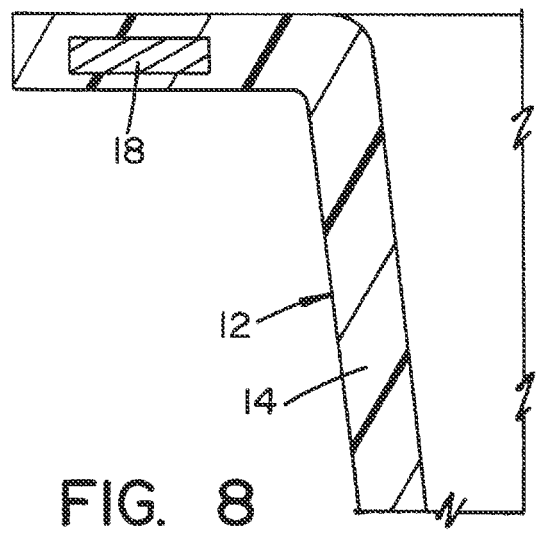
FIG. 8 is a partial cross-sectional view of a first vehicle component shown according to an alternate embodiment wherein a magnet is fully encapsulated within the nonmetallic body of the first vehicle component.

Alternatively, though not shown in FIG. 3, the magnet 18 need not require the aperture 74 and can be secured to the mold half 70 without the pin 72. In other words, only the magnetic attraction between the magnet and one of the mold halves can be used for securing the relative position of the magnet within the mold cavity 66. Alternately, further known techniques for securing the relative position of the magnet within the mold cavity 66 can be used. For example, the magnet 18 can be secured within a recess defined in one of the mold halves 68, 70, can be secured via a retractable pin, etc. However secured, once the at least one magnet is in position, the mold halves 68, 70 can be closed as shown in FIG. 4 and the first vehicle component 12 can be molded (e.g., injection molded) within the mold cavity 66 defined by the mold halves 68, 70 as is known and understood by those skilled in the art. With brief reference to FIG. 8, in an alternate embodiment, the at least one magnet (e.g., magnet 18) can be fully encapsulated by the first vehicle component 12. Thus, in FIG. 8, overmolding of the first vehicle component 12 onto said at least one magnet (e.g., magnet 18) can include fully encapsulating said at least one magnet within the first vehicle component 12. As mentioned herein above, the first vehicle component 12 that is molded in the mold cavity 66 can be molded of at least one of a plastic, a resin, or a composite, thus the first vehicle component 12 has the generally nonmetallic body 14 due to being molded from a nonmetallic material.

Figure 5:
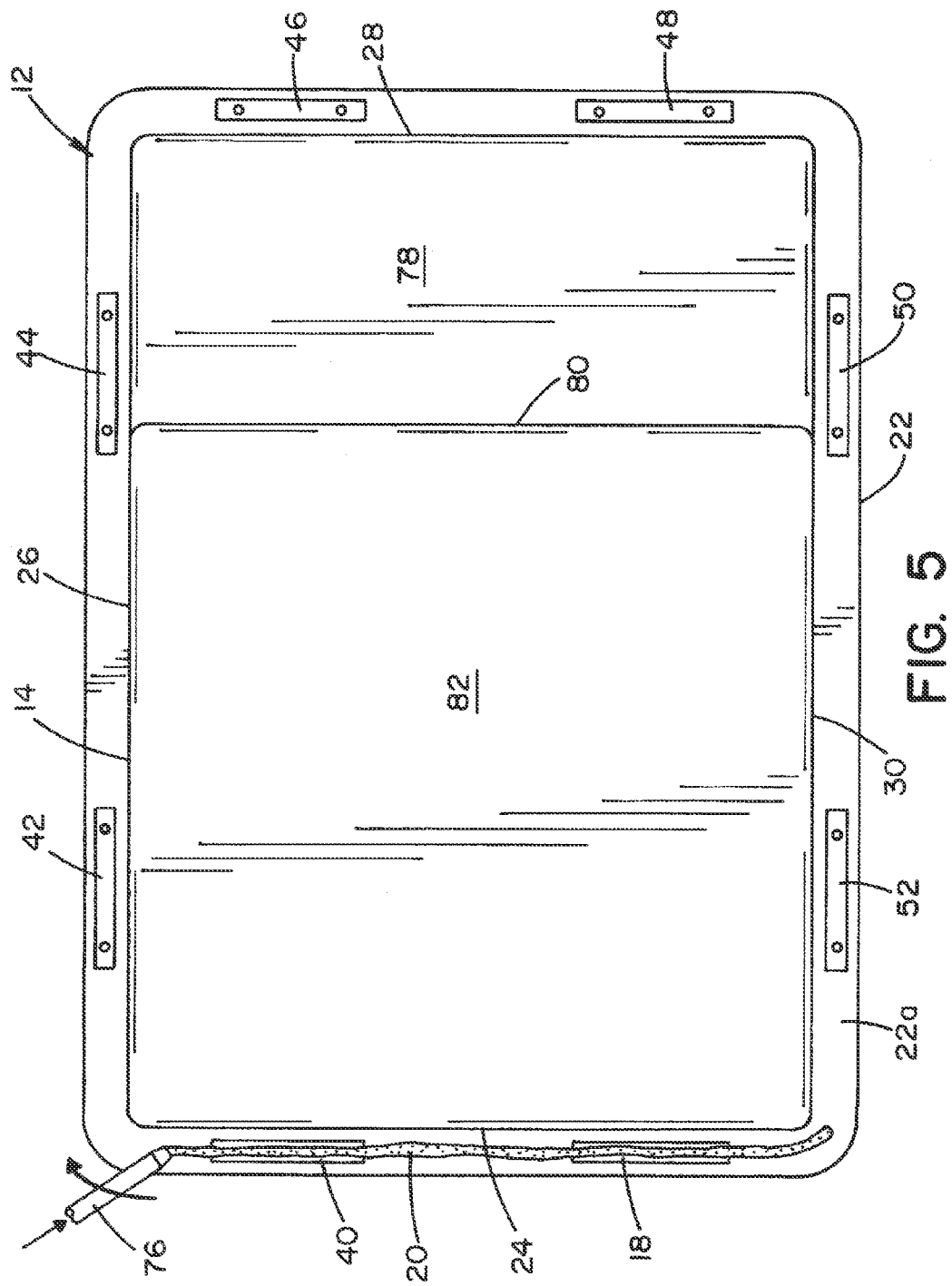
FIG. 5 is an underside plan view of the first vehicle component of FIG. 1 showing an adhesive being applied to a mounting flange thereof.

Though not shown, the method of FIG. 9 can additionally include preparing at least one of the first vehicle component 12 and the second vehicle component 16 for bonding with the adhesive 20 by treating one or more surfaces of the first and second vehicle components prior to applying the adhesive 20. For example, such preparing can include chemical cleaning, flame treatment, etc., as is known and appreciated by those skilled in the art. After such preparing, the adhesive 20 can be applied to one or both of the first and second vehicle components 12, 16. With particular reference to FIG. 5, the adhesive 20 is shown being applied via an applicator 76 to the first vehicle component 12. In particular, such as when the first vehicle component 12 is a spare tire pan and the second vehicle component 16 is a body-in-white vehicle body, the adhesive 20 can be applied via the applicator 76 to the underside 22a of the mounting flange 22 of the generally nonmetallic body 14 of the first vehicle component 12. As shown, the mounting flange 22 defines an upper perimeter of the spare tire pan 12 and the walls 24-30 depend downward from the mounting flange 22 for defining the storage compartment area 32 (FIG. 1). Additional walls 78, 80, 82 can define a floor of the first vehicle component 12.

In the method, and as already mentioned relative to the vehicle 10 and the securing arrangement therefore, the at least one magnet that is fixably secured to the generally nonmetallic body 14 of the first vehicle component 12 includes the plurality of magnets 18, 40-52 that are spaced apart from one another along the mounting flange 22. Particularly, and as shown, the plurality of magnets 18, 40-52 can be disposed on the underside 22a of the mounting flange 22. It will be appreciated by those skilled in the art that the magnets 18, 42-52 could be any type of magnet, such as bar type, band type, etc.

Figure 6:
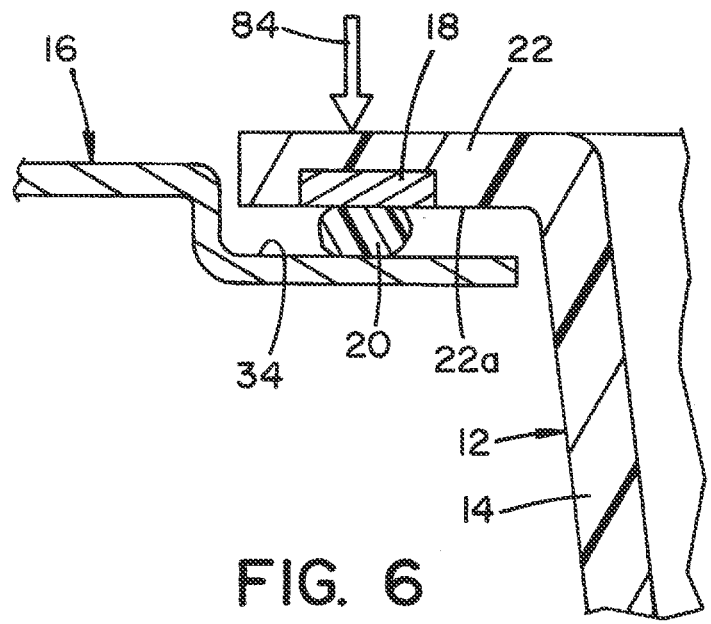
FIG. 6 is a cross-sectional view showing the first vehicle component, particularly the mounting flange thereof, being positioned relative to the second vehicle component, particularly relative to a mounting surface thereof.
Figure 7:
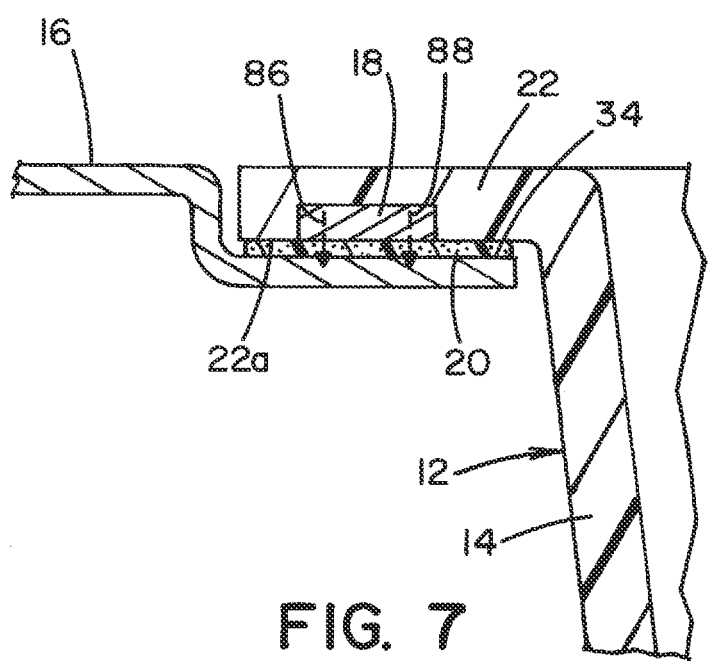
FIG. 7 is a cross-sectional view similar to FIG. 6 but showing final positioning of the first vehicle component relative to the second vehicle component with the magnet retaining the relative positioning between the first and second vehicle components.

With reference now to FIG. 6, positioning at least one of the first vehicle component 12 or the second vehicle component 16 relative to the other of the first and second vehicle components 12, 16 in 64 can include applying pressure, as schematically indicated at 84, to at least one of the first vehicle component 12 or the second vehicle component 16 for increasing contact between the first and second vehicle components 12, 16 with the adhesive 20. Particularly, in the illustrated embodiment, pressure is applied as shown at 84 to the mounting flange 22 to urge the mounting flange 22, and particularly the underside 22a thereof, toward the mounting surface 34 of the second metallic vehicle component 16. This has the effect of spreading the adhesive 20 and better aligning the relative positions between the first and second vehicle components 12, 16 so as to achieve the relative positioning shown in FIG. 7. Once the first vehicle component 12 is in position, the plurality of magnets 18, 40-52 apply a magnetic holding force, as indicated by the arrows 86, 88 in FIG. 7, that urge the mounting flange 22 toward the corresponding mounting surface 34 defined by the second vehicle component 16.

Advantageously, use of the magnets 18, 40-52 prevents relative movement between the first vehicle component 12 and the second vehicle component 16. This is useful in vehicle production in that when the second vehicle component 16 is a vehicle body it can continue moving down in assembly line for vehicle production without risk of relative movement between the first vehicle component 12 and the second vehicle component 16 while the adhesive 20 is setting. In other words, the magnetic force between the vehicle components 12, 16 provided by the magnets 18, 40-52 is used to hold the first vehicle component 12 in position relative to the second vehicle component 16 while the adhesive 20 cures. A further advantage is that this method is less expensive for securing a nonmetallic body to a metallic vehicle component in a production assembly environment. No additional bond fixturing or alternate mechanical attachment methods are necessary to control the bond surfaces while the adhesive cures. Also, normal production assembly can be conducted on the vehicle white body as the adhesive bond cures.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for securing a first vehicle component having a generally nonmetallic body to a second metallic vehicle component, comprising:
    providing the first vehicle component with at least one magnet fixedly secured to the generally nonmetallic body of the first vehicle component, wherein providing the first vehicle component with said at least one magnet includes overmolding the first vehicle component onto said at least one magnet;
    applying an adhesive to at least one of the first vehicle component or the second vehicle component; and
    positioning at least one of the first vehicle component or the second vehicle component relative to the other of the first vehicle component or the second vehicle component for connecting the first and second vehicle components with the adhesive, wherein said at least one magnet prevents relative movement between the first and second vehicle components while the adhesive cures.

2. The method of claim 1 wherein positioning at least one of the first vehicle component and the second vehicle component relative to one another includes applying pressure to at least one of the first vehicle component or the second vehicle component for increasing contact between the first and second vehicle components with the adhesive.

3. The method of claim 1 further including:
    preparing at least one of the first vehicle component and the second vehicle component for bonding with the adhesive by treating one or more surfaces of the first and second vehicle components prior to applying the adhesive.

4. The method of claim 1 wherein said overmolding includes:
    inserting said at least one magnet into a mold cavity;
    securing a position of said at least one magnet within the mold cavity by positioning said at least one magnet on one of the mold halves forming the mold cavity, wherein magnetic attraction between the at least one magnet and said one of the mold halves secures the position of said at least one magnet within the mold cavity;
    closing the mold halves; and
    molding the first vehicle component within the mold cavity defined by the mold halves.

5. The method of claim 4 wherein said one of the mold halves includes at least one pin and said at least one magnet defines an aperture for fitting said at least one magnet onto said at least one pin, receipt of said at least one pin in the aperture of said at least one magnet further secures said position of said at least one magnet within the mold cavity.

6. The method of claim 1 wherein overmolding the first vehicle component onto said at least one magnet includes fully encapsulating said at least one magnet within the first vehicle component.

7. The method of claim 1 wherein the first vehicle component is molded of at least one of a plastic, a resin or a composite.

8. The method of claim 1 wherein the first vehicle component is a spare tire pan and the second vehicle component is a body-in-white vehicle body.

9. The method of claim 8 wherein the spare tire pan includes a mounting flange defining an upper perimeter of the spare tire pan and walls depending downward from the mounting flange for defining a compartment storage area.

10. The method of claim 9 wherein said least one magnet includes a plurality of magnets spaced apart from one another along the mounting flange, the plurality of magnets applying a holding force that urges the mounting flange toward a corresponding mounting surface defined by the second vehicle component.

11. The method of claim 10 wherein said plurality of magnets are disposed on an underside of the mounting flange.

12. A method for securing a first vehicle component having a generally nonmetallic body to a second metallic vehicle component, comprising:
 providing the first vehicle component with at least one magnet fixedly secured to the generally nonmetallic body of the first vehicle component, wherein the first vehicle component is a spare tire pan and the second vehicle component is a body-in-white vehicle body;
 applying an adhesive to at least one of the first vehicle component or the second vehicle component: and
 positioning at least one of the first vehicle component or the second vehicle component relative to the other of the first vehicle component or the second vehicle component for connecting the first and second vehicle components with the adhesive, wherein said at least one magnet prevents relative movement between the first and second vehicle components while the adhesive cures.

13. The method of claim 12 wherein the spare tire pan includes a mounting flange defining an upper perimeter of the spare tire pan and walls depending downward from the mounting flange for defining a compartment storage area.

14. The method of claim 13 wherein said least one magnet includes a plurality of magnets spaced apart from one another along the mounting flange, the plurality of magnets applying a holding force that urges the mounting flange toward a corresponding mounting surface defined by the second vehicle component.

15. The method of claim 14 wherein said plurality of magnets are disposed on an underside of the mounting flange.

16. The method of claim 14 wherein applying the adhesive includes applying the adhesive to one or both of the mounting flange or the mounting surface.

17. The method of claim 12 wherein positioning at least one of the first vehicle component and the second vehicle component relative to one another includes applying pressure to at least one of the first vehicle component or the second vehicle component for increasing contact between the first and second vehicle components with the adhesive.

18. The method of claim 12 further including:
 preparing at least one of the first vehicle component and the second vehicle component for bonding with the adhesive by treating one or more surfaces of the first and second vehicle components prior to applying the adhesive.

\* \* \* \* \*